(12) United States Patent
Cheng

(10) Patent No.: US 8,251,292 B2
(45) Date of Patent: Aug. 28, 2012

(54) PROCESSING METHOD OF BARCODE AND APPARATUS THEREOF

(75) Inventor: Ting-Yuan Cheng, Taipei County (TW)

(73) Assignee: Primax Electronics Ltd., Neihu, Taipei (TW)

( * ) Notice: Subject to any disclaimer, the term of this patent is extended or adjusted under 35 U.S.C. 154(b) by 365 days.

(21) Appl. No.: 12/684,962

(22) Filed: Jan. 10, 2010

(65) Prior Publication Data

US 2011/0084142 A1    Apr. 14, 2011

(30) Foreign Application Priority Data

Oct. 9, 2009  (TW) ............................. 98134286 A

(51) Int. Cl.
*G06K 7/10* (2006.01)
(52) U.S. Cl. ............... 235/462.25; 235/462.01
(58) Field of Classification Search .......... 235/462.01–462.45, 472.01, 472.02, 235/472.03, 454, 455
See application file for complete search history.

(56) References Cited

U.S. PATENT DOCUMENTS

| | | | | |
|---|---|---|---|---|
| 2008/0095468 | A1* | 4/2008 | Klemmer et al. | 382/285 |
| 2010/0200658 | A1* | 8/2010 | Olmstead et al. | 235/455 |
| 2010/0304640 | A1* | 12/2010 | Sofman et al. | 446/456 |
| 2012/0002066 | A1* | 1/2012 | Wang | 348/222.1 |

* cited by examiner

*Primary Examiner* — Thien M Le
(74) *Attorney, Agent, or Firm* — Winston Hsu; Scott Margo

(57) ABSTRACT

A processing method of detecting a barcode from an original image includes: an edge processing process, a barcode positioning process and a projection modification process. The edge processing process is for converting an original image into a binarized input image. The barcode positioning process is for deriving position information of the barcode, and includes: deriving a plurality of luminance groups according to luminance values of all pixels of the input image; utilizing a determining circuit to determine whether each luminance group complies with an identification bar and to derive position information of the identification bars; and deriving position information of the barcode according to the position information of the identification bars. The projection modification process converts the original image into a modified image according to the position information of the barcode.

18 Claims, 17 Drawing Sheets

PROCESSING METHOD OF BARCODE AND APPARATUS THEREOF

BACKGROUND OF THE INVENTION

1. Field of the Invention

The present invention relates to a barcode processing method and a related apparatus, and more particularly, to a barcode processing method of detecting and adjusting a barcode within an input image and an apparatus thereof.

2. Description of the Prior Art

For business activities such as trading goods and inventory management, barcodes provide a fast and convenient identification method. Barcodes have different coding principles (for example, EAN-13, EAN-8, etc.) according to different requirements. A symbol in a barcode, which is for decoding purposes, is composed of a specific number of identification bars. In a practical implementation, a scanner is utilized to scan and receive reflected light from identification bars of a barcode, and a converter is utilized to convert the reflected light into corresponding electric signals. Apart from decoding with traditional scanners and converters, barcodes may also be applied in conjunction with some modern image processing techniques. A variety of related applications have been developed, for example, a digital camera and a decoding software are utilized to decode multiple barcodes simultaneously.

However, a surface where a barcode is located might be deteriorated due to projection distortion, uneven luminance distribution or interference from other image patterns, and therefore the barcode cannot be decoded correctly. As a result, how to derive a barcode properly in a given image is still a major issue in this field.

SUMMARY OF THE INVENTION

In light of this, the present invention provides a detecting and processing method of barcodes and a related apparatus for preprocessing an original image to rule out the influence of projection distortion and/or uneven luminance distribution. The method and apparatus further adjust the original image to facilitate following decoding processes.

In a first embodiment of the present invention, a processing method of barcodes for detecting a barcode from an original image is provided. The processing method includes an edge processing procedure, a barcode positioning process and a projection modification process. The edge processing procedure converts the original image into a binarized input image. The barcode positioning process is configured to derive position information of the barcode and includes the following steps: deriving a plurality of luminance groups according to luminance values of all pixels of the input image; utilizing a determining circuit to determine whether each luminance group complies with an identification bar of the barcode and to derive position information of the identification bars; and deriving the position information of the barcode according to the position information of the identification bars. The projection modification process converts the original image into a modified image according to the position information of the barcode.

In a second embodiment of the present invention, a barcode processing method for adjusting an input image according to an input image and a position information of an identification bar of a barcode within the input image is provided. The processing method comprises: applying a mask at a first address of the input image according to the position information of the identification bar to derive a first luminance information, wherein the first address corresponds to the identification bar within the input image; applying the mask at a second address of the input image to derive a second luminance information, wherein a distance between the first address and the second address is a designated distance; and determining whether to adjust a position of the identification bar within the input image according to the first luminance information and the second luminance information.

In a third embodiment of the present invention, a barcode processing apparatus for detecting a barcode from an original image is provided. The barcode processing apparatus includes an edge processing module, a barcode positioning module, a determining circuit and a detection circuit. The edge processing module converts the original image into a binarized input image. The barcode positioning module is configured to derive position information of the barcode and includes a capture circuit, determining circuit and a detection circuit. The capture circuit derives a plurality of luminance groups according to luminance values of all pixels of the input image. The determining circuit is for determining whether each luminance group complies with an identification bar of the barcode and deriving position information of the identification bars. The detection circuit is for deriving position information of the barcode according to the position information of the identification bars. The projection modification module converts the original image into a modified image according to the position information of the barcode.

In a fourth embodiment of the present invention, a preprocessing apparatus of barcodes for adjusting an input image according to an input image and a position information of an identification bar of a barcode within the input image is provided. The processing apparatus includes a first luminance circuit, second luminance circuit, and an adjusting circuit. The first luminance circuit applies a mask at a first address of the input image according to the position information of the identification bar to derive a first luminance information, wherein the first address corresponds to the identification bar within the input image. The second luminance circuit applies the mask at a second address of the input image to derive a second luminance information, wherein a distance between the first address and the second address is a designated distance. The adjusting circuit is for determining whether to adjust a position of the identification bar within the input image according to the first luminance information and the second luminance information.

The present invention provides a barcode processing method and a related apparatus thereof, which can effectively derive barcodes within an input image utilizing related information to solve for projection distortion and uneven luminance distribution. In addition, the present invention is further capable of adjusting the barcode such that it can be decoded and processed by a following processing apparatus more easily.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
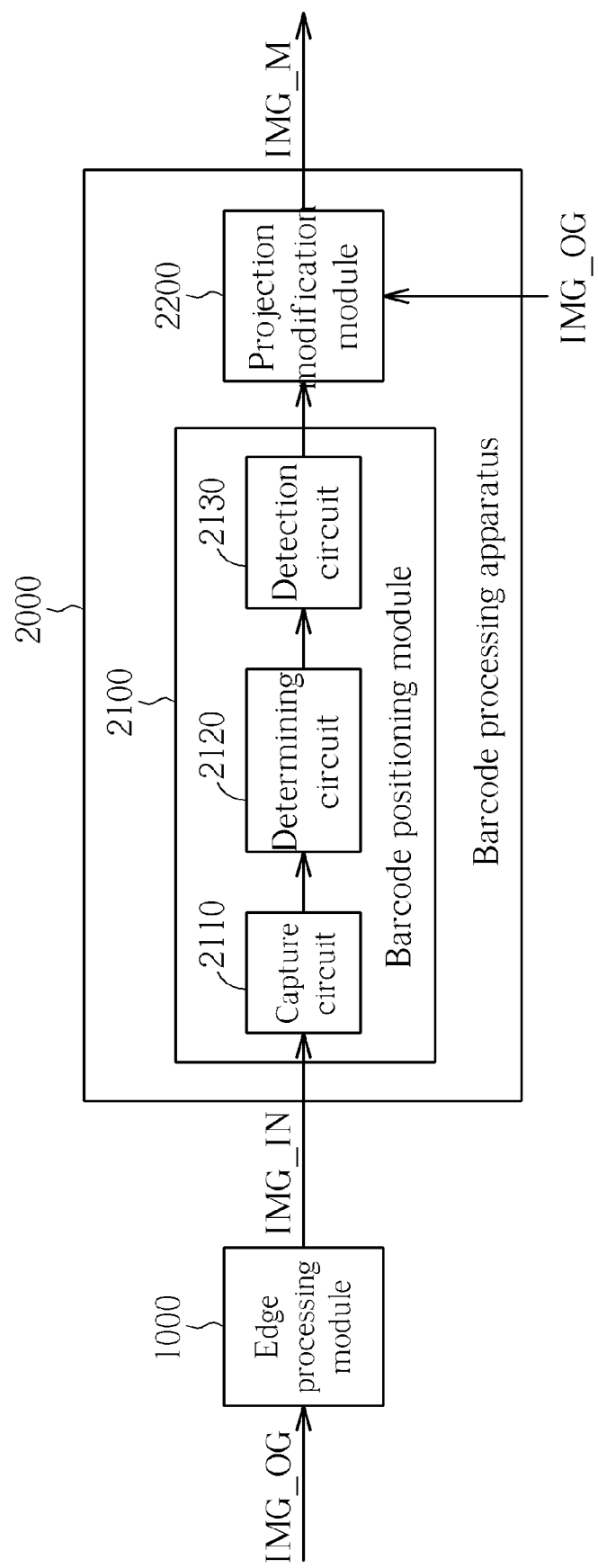
FIG. 1 is a system block diagram of a barcode processing device according to an embodiment of the present invention.

Please refer to FIG. 1, which is a system block diagram of a barcode processing device according to an embodiment of the present invention. It includes (but is not limited to) an edge processing module 1000 and a barcode processing apparatus 2000, wherein the barcode processing apparatus 2000 is for deriving a position information of a barcode from an input image IMG_IN. The barcode processing apparatus 2000 includes a barcode positioning module 2100 and a projection modification module 2200. Please refer to FIG. 1, FIG. 2 and FIG. 3 simultaneously, FIG. 2 is an exemplary block diagram of the edge processing module 1000 in FIG. 1, and FIG. 3 is an exemplary operation flowchart of the edge processing module 1000 in FIG. 1.

Figure 2:
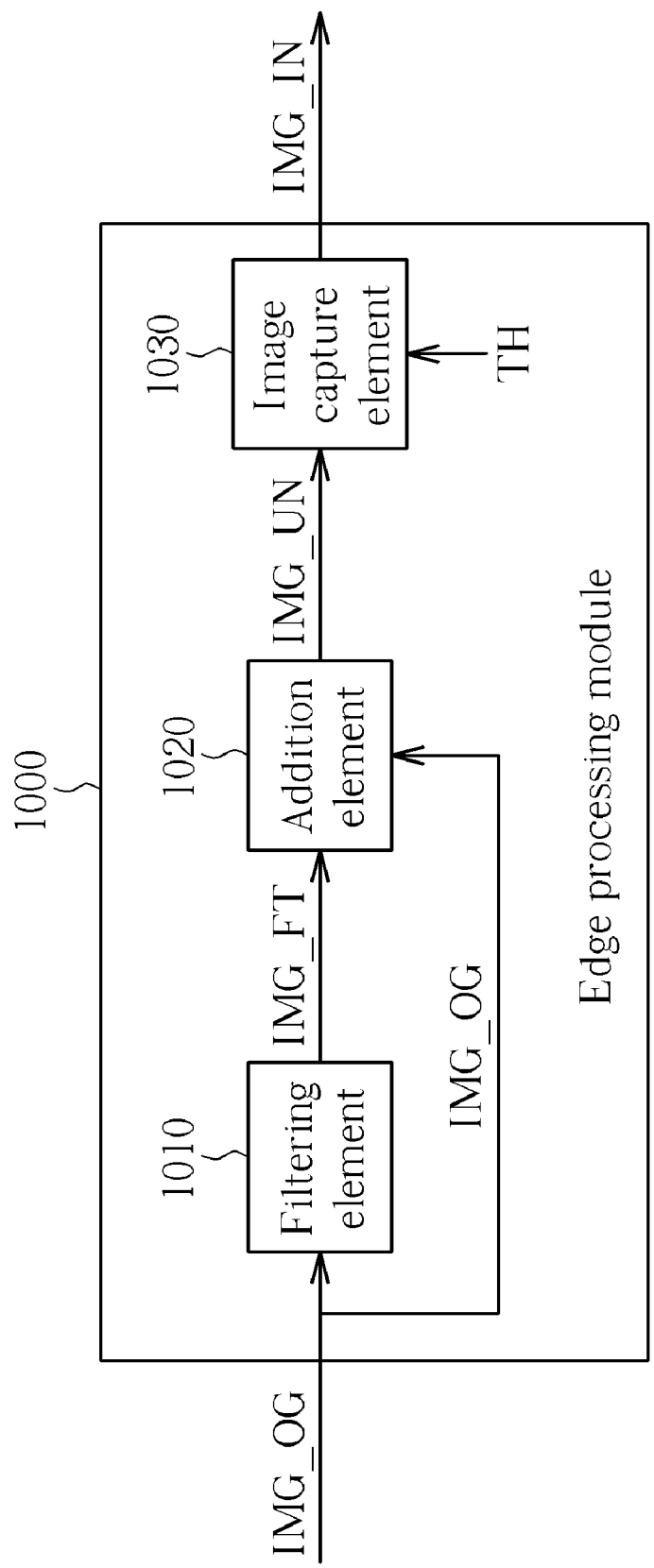
FIG. 2 is an exemplary block diagram of an edge processing module in FIG. 1.
Figure 3:
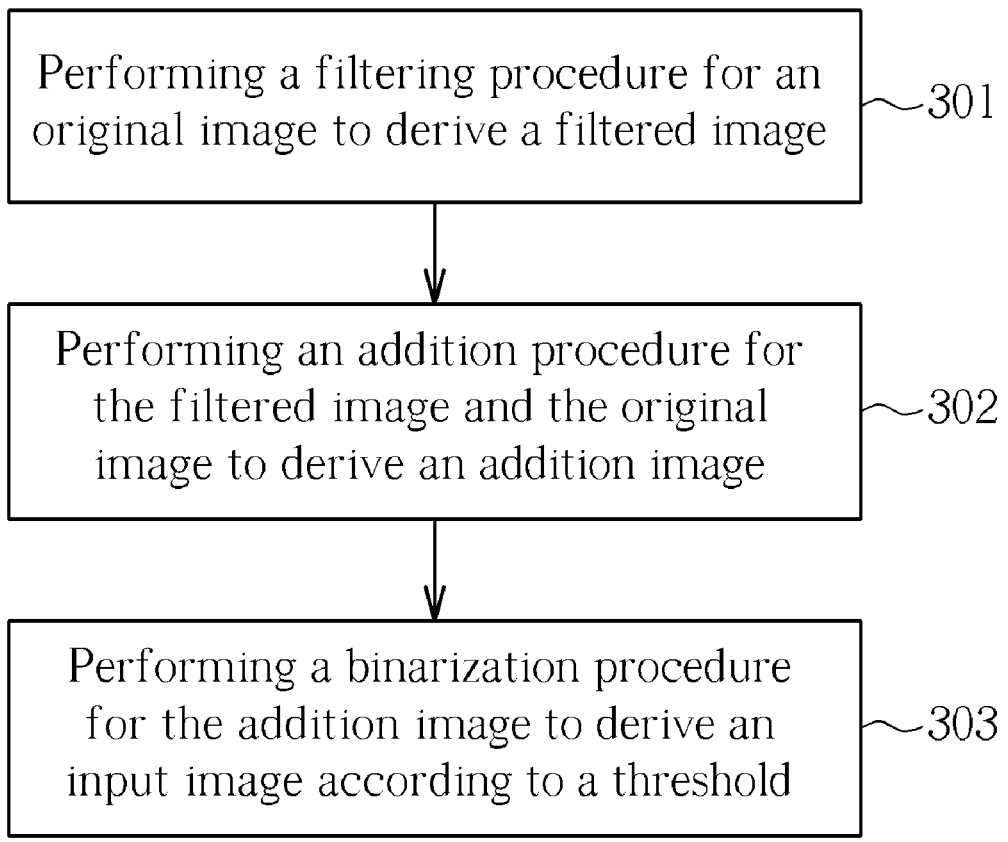
FIG. 3 is an exemplary operation flowchart of an edge processing module in FIG. 1.

In FIG. 2, the edge processing module 1000 includes a filtering element 1010, an addition element 1020 and an image capture element 1030. The filtering element 1010 is for performing a filtering procedure for an original image IMG_OG to derive a filtered image IMG_FT (step 301). The addition element 1020 performs an addition procedure for the filtered image IMG_FT and the original image IMG_OG to derive an addition image IMG_UN (step 302). The image capture element performs a binarization procedure for the addition image IMG_UN to derive an input image IMG_IN according to a threshold TH (step 303). After the filtering process of the original image IMG_OG, a filtered image IMG_FT with enhanced object edge can be derived. The following equation is an exemplary filter F adopted in this embodiment:

$$F = \frac{1}{7} \times \begin{bmatrix} -1 & -2 & -1 \\ -2 & 19 & -2 \\ -1 & -2 & -1 \end{bmatrix} \qquad (1)$$

The addition image IMG_UN, which is from the filtered image IMG_FT and the original image IMG_OG, has a more obvious contrast of light and dark than the original image IMG_OG, i.e., a luminance difference between each pixel within the addition image IMG_UN will be larger than the addition procedure, and a difference between high-luminance pixel and low-luminance pixel will become more obvious. In this way, the image capture element 1030 can binarize high-luminance pixels and low-luminance pixels to derive the input image IMG_IN according to the threshold TH.

Please note that, in this embodiment, the barcode processing device applies the edge processing module 1000 to derive an edge-enhanced binarized image (i.e., the input image IMG_IN) to facilitate the following processing of the barcode processing apparatus 2000. However, in other embodiments, the original image IMG_OG can also be an input of the barcode processing apparatus 2000 to be processed without the edge processing module 1000. This kind of variation in design also falls within the scope of the present invention.

Figure 4:
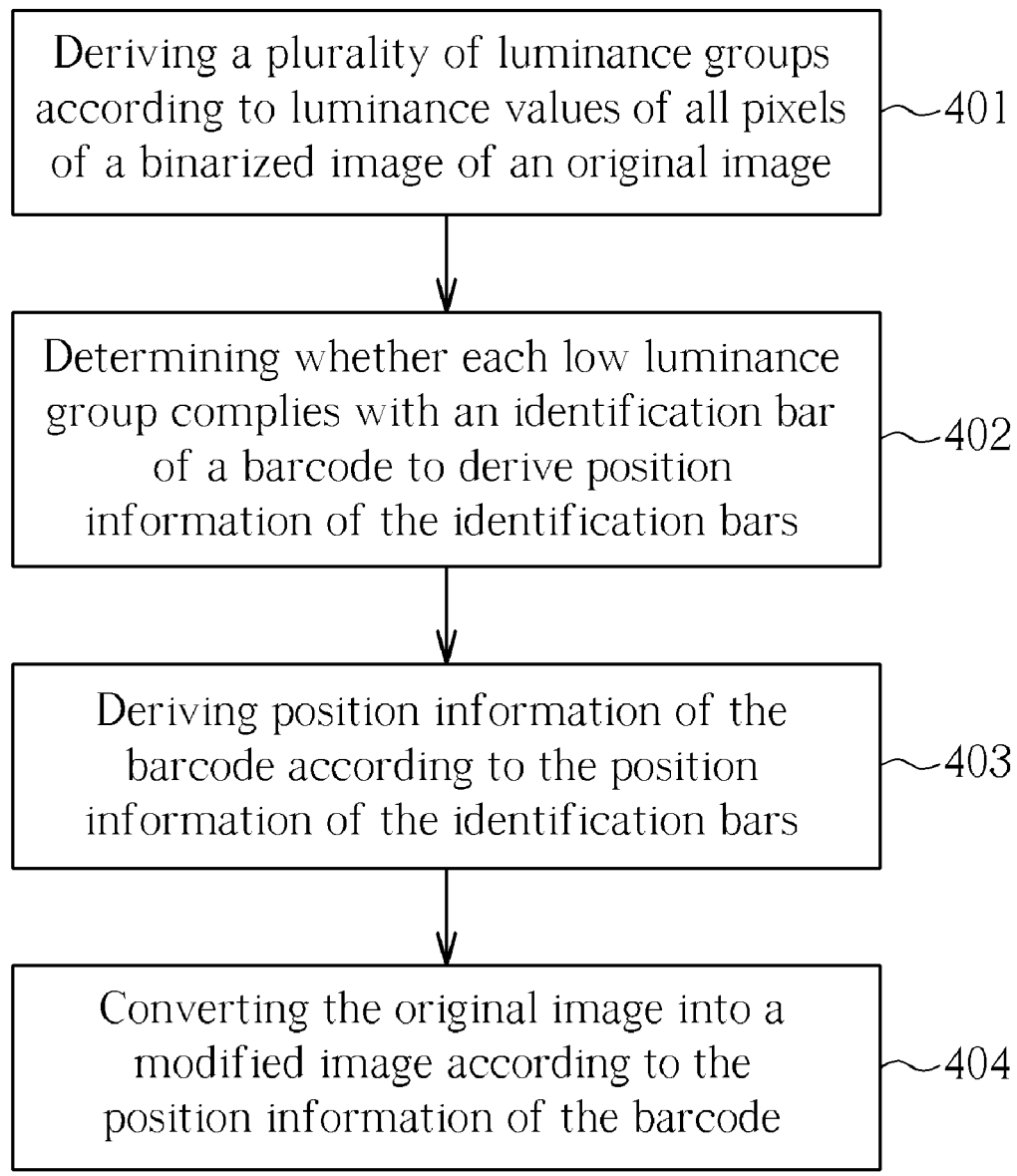
FIG. 4 is an exemplary operation flowchart of a barcode processing apparatus in FIG. 1.

Please refer to FIG. 4 in conjunction with FIG. 1. FIG. 4 is an exemplary operation flowchart of the barcode processing apparatus 2000 in FIG. 1. In this embodiment, the barcode positioning module 2100 includes a capture circuit 2110, a determining circuit 2120 and a detection circuit 2130. The capture circuit 2110 is for deriving a plurality of low luminance groups according to luminance values of all pixels a binarized image of an original image IMG_OG (step 401). Please note that, in this embodiment, only low luminance groups are processed, but this is not supposed to be a limitation of the present invention, and processing high luminance groups also falls within the scope of the present invention. The determining circuit 2120 is coupled to the capture circuit 2110, and is for determining whether each low luminance group complies with an identification bar of the barcode to derive position information of the identification bars (step 402). The detection circuit 2130 derives position information of the barcode according to the position information of the identification bars (step 403). Finally, the projection modification module 2200 converts the original image IMG_OG into a modified image IMG_M according to the position information of the barcode (step 404).

Figure 5:
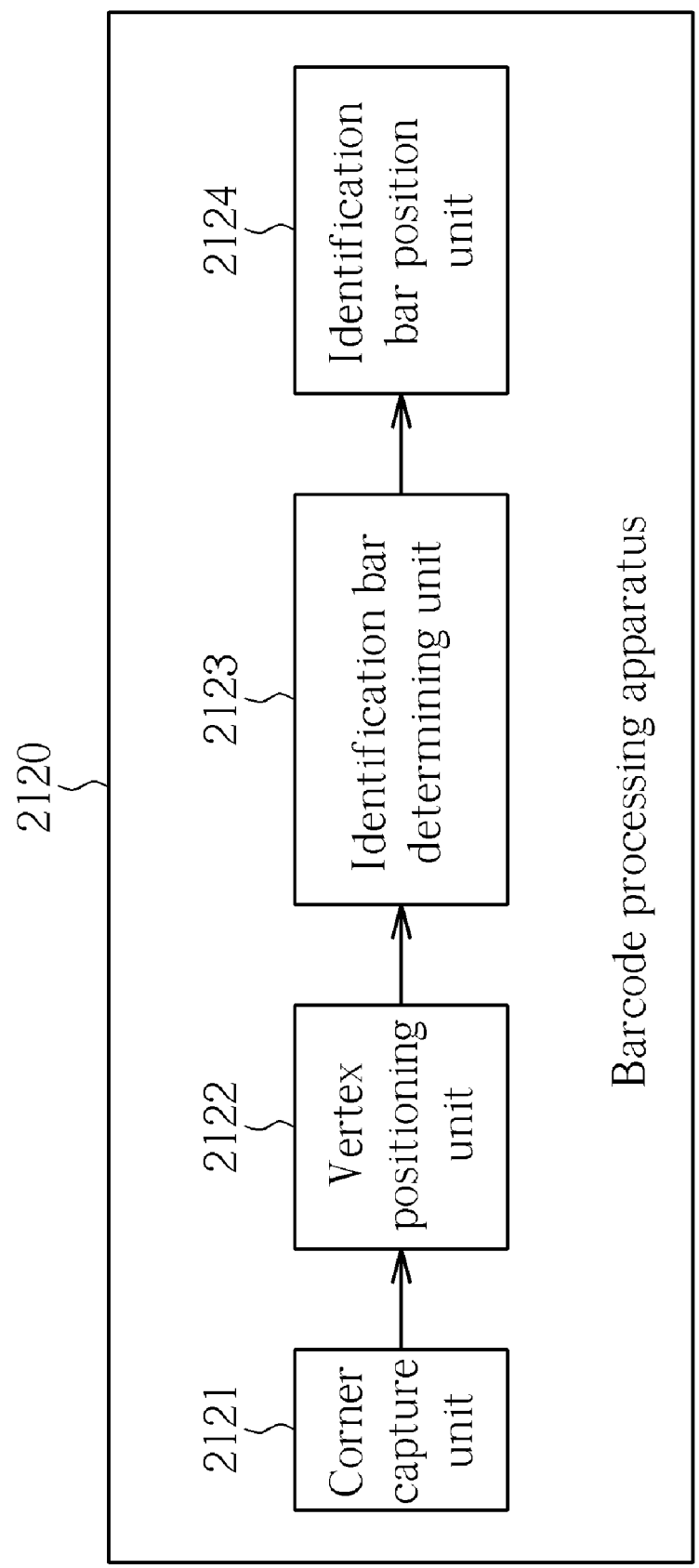
FIG. 5 is an exemplary block diagram of a determining circuit in FIG. 1
Figure 6:
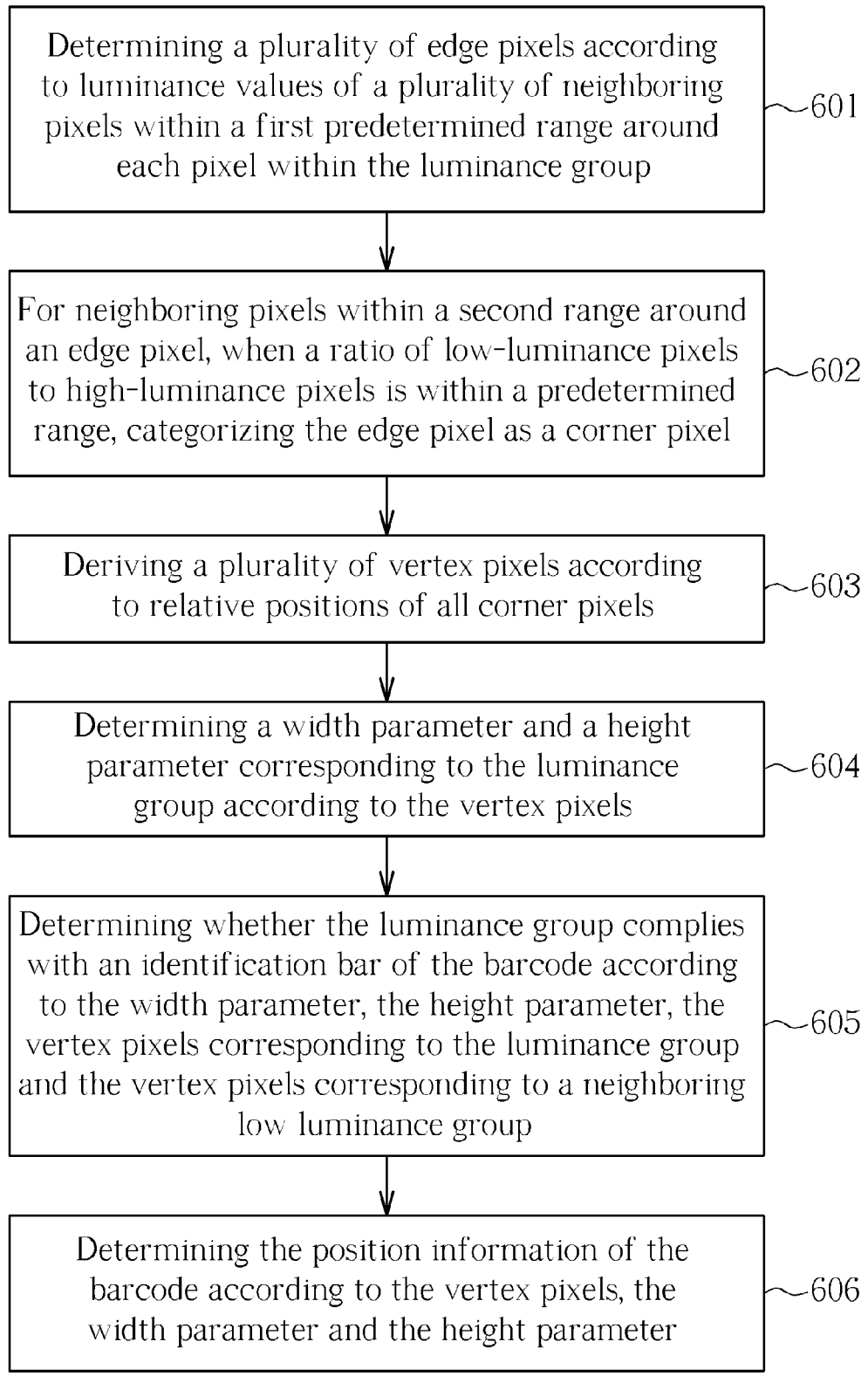
FIG. 6 is an exemplary operation flowchart of the determining circuit shown in FIG. 1.

Please refer to FIG. 5 and FIG. 6 for further illustration of an operation of the determining circuit 2120. FIG. 5 is an exemplary block diagram of the determining circuit 2120 in FIG. 1, and FIG. 6 is an exemplary operation flowchart of the determining circuit 2120 in FIG. 1. In this embodiment, the determining circuit 2120 includes a corner capture unit 2121, a vertex capture unit 2122, an identification bar determining unit 2123 and an identification bar positioning unit 2124. The corner capture unit 2121 is for determining a plurality of edge pixels according to luminance values of a plurality of neighboring pixels within a first predetermined range around each pixel within the low luminance group (step 601), and determining whether each edge pixel is a corner pixel according to luminance values of a plurality of neighboring pixels within a second range around each edge pixel. For the neighboring pixels, when a ratio of low-luminance pixels to high-luminance pixels is within a predetermined range, the corner capture unit 2121 categorizes the edge pixel as a corner pixel (step 602). The vertex capture unit 2122 derives a plurality of vertex pixels according to relative positions of all corner pixels (step 603), and determines a width parameter W and a height parameter H corresponding to the low luminance group according to the vertex pixels (step 604). The identification bar positioning unit 2123 determines whether the low luminance group complies with an identification bar of the barcode according to the width parameter W, the height parameter H, the vertex pixels corresponding to the low luminance group and the vertex pixels corresponding to a neighboring low luminance group (step 605). Finally, the identification bar positioning unit 2124 determines the position information of the barcode according to the vertex pixels, the width parameter W and the height parameter H (step 606).

Figure 7:
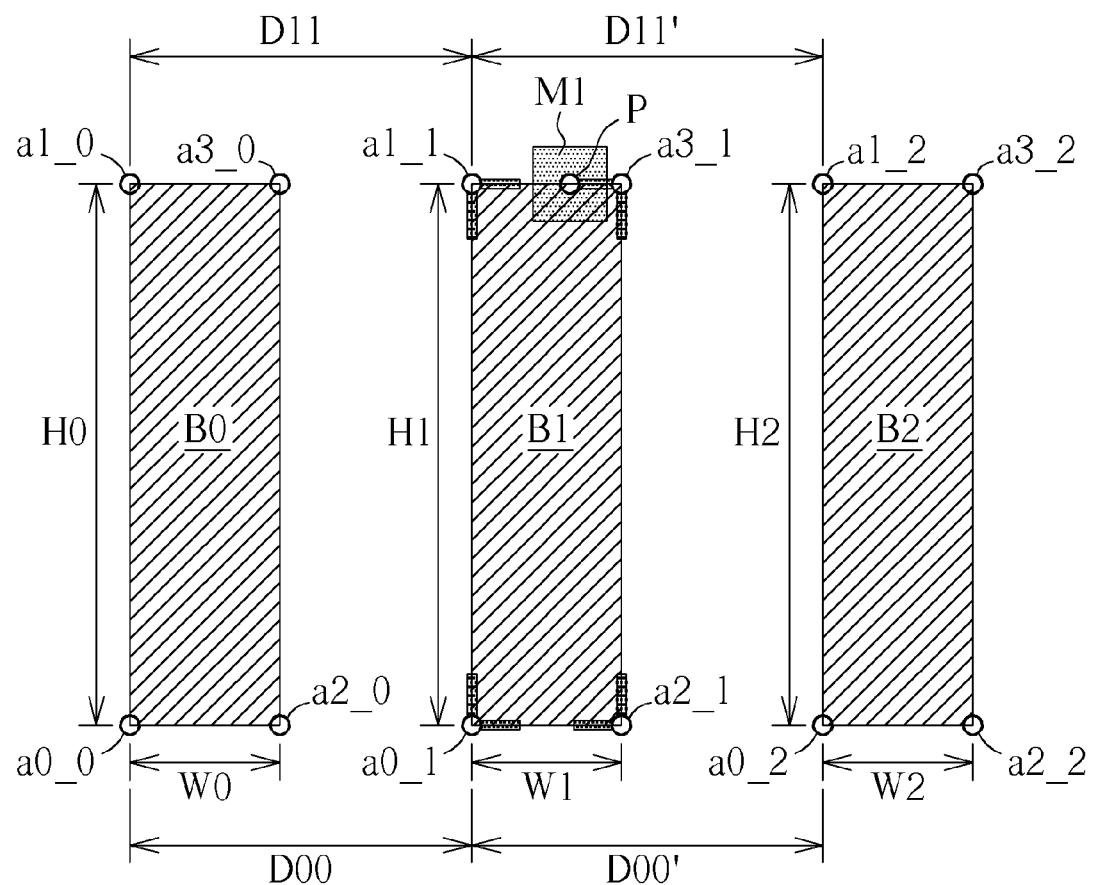
FIG. 7 is an exemplary operation diagram of a determining circuit according to an embodiment of the present invention.

For an example of this process, please refer to FIG. 7, which is an exemplary operation diagram of the determining circuit 2120 according to an embodiment of the present invention. For each pixel within an identification bar B1, the corner capture unit 2121 of the determining circuit 2120 determines a plurality of edge pixels according to luminance values of neighboring pixels near the pixel. When there is a neighboring pixel having a high luminance value near a pixel of the identification bar B1, this indicates that the pixel is located at an edge of the identification bar B1, and therefore the corner capture unit 2121 determines that the pixel is an edge pixel. Next, for an edge pixel P, the corner capture unit 2121 applies a mask M1 for the edge pixel P to derive luminance values of all neighboring pixels within a first predetermined range (i.e., a coverage of the mask M1) around the edge pixel P, and the corner capture unit 2121 categorizes each neighboring pixel within the first predetermined range as a high luminance pixel or a low luminance pixel according to a luminance threshold. Assuming the edge pixel P is not located at a corner of the identification bar B1, there are mostly high luminance pixels around the edge pixel P, and a ratio of high-luminance pixels to low-luminance pixels within the first predetermined range will be less than a specific value; whereas if the edge pixel P is located at a corner of the identification bar B1, the ratio of high-luminance pixels to low-luminance pixels within the first predetermined range will be within a predetermined value range. In this embodiment, if the ratio of high-luminance pixels to low-luminance pixels within the first predetermined range is indicated by R, wherein R=number of high-luminance pixels/number of low-luminance pixels, the corner capture unit 2121 will determine whether the edge pixel P is a corner pixel or not according to the following equation:

$$R \geq 0.7 \quad (2)$$

When there is no distortion in the input image IMG_IN, the value of R is theoretically very close to 3, however, considering projection distortion, setting 0.7 as a lower limit of R should be proper to derive corner pixels of the finder pattern FP1 more correctly.

After the corner capture unit 2121 processes all the pixels within the identification bar B1, the vertex capture unit 2122 will derive a plurality of vertex pixels according to relative positions of the corner pixels. For example, the vertex capture unit 2122 will assign one of the corner pixels (whose coordinate is (X, Y)) as a first vertex pixel a0_1 (whose coordinate is (X0, Y0)=(X, Y)), and thereby compare all the other corner pixels with the first vertex pixel a0_1. When a horizontal coordinate of a specific corner pixel (whose coordinate is (X', Y')) is smaller than a horizontal coordinate of the first vertex pixel a0_1 and a vertical coordinate of the specific corner pixel is smaller than a horizontal coordinate of the first vertex pixel a0_1, i.e., X'<X1 and Y'<Y1, the vertex capture unit 2122 assigns the specific corner pixel as the first vertex pixel a0_1 instead (i.e., (X1, Y1)=(X', Y')). After processing all the corner pixels, the vertex capture unit 2122 can derive a position of the first vertex pixel a0_1 (i.e., the pixel at the lower left corner of identification bar B1). Likewise, the vertex capture unit 2122 can derive vertex pixels a1_1, a2_1 and a3_1, which are located at the upper left corner, the lower right corner and upper right corner of the identification bar B1, respectively. Finally, the vertex capture unit 2122 will derive a height parameter H1 and a width parameter W1 of the identification bar B1 according to the four vertex pixels a0_1, a1_1, a2_1 and a3_1. However, in other embodiments, the vertex capture unit 2122 may only derive three vertex pixels. Under this circumstance, the vertex capture unit 2122 will deduce the fourth vertex pixel according to three known vertex pixels. In addition, the vertex capture unit 2122 can modify criteria of deriving vertex pixels according to different design requirements: for example, the vertex capture unit 2122 may also choose vertex pixels on the farthest left corner, the farthest right corner, the farthest lower corner and the farthest upper corner of the identification bar B1.

After height parameters, width parameters and vertex pixels of all identification bars are derived, the identification bar determining unit 2123 determines a direction of the barcode containing the identification bar B1 according to a ratio of the height parameter H1 to the width parameter W1 of the identification bar B1. For instance, in the example of FIG. 7, the ratio of the height parameter H1 to the width parameter W1 of the identification bar B1 H1/W1>1, which indicates that the barcode containing the identification bar B1 is distributed horizontally; however, in other embodiments, if H1/W1<1, it indicates that the barcode containing the identification bar B1 is distributed vertically. Nevertheless, the identification bar determining unit 2123 still requires more criteria to assure that the identification bar B1 is a part of a barcode. Please refer to FIG. 8, which is a diagram of a pattern having a barcode characteristic that is not a part of a barcode. After being processed by the identification bar determining unit 2123, an identification bar B1_2 in FIG. 8 also has four vertex pixels a0_e, a1_e, a2_e, a3_e and height parameter H1_e as well as width parameter W1_e. From the figure, a ratio of the height parameter H1_to the width parameter W1_e H1_e/W1_e>1, but the identification bar B1_e is not a part of any barcode. Therefore, other predetermined criteria are set for the identification bar determining unit 2123 to derive an identification bar of a barcode correctly. (function difference in "2123" and "2124" ?)

Figure 8:
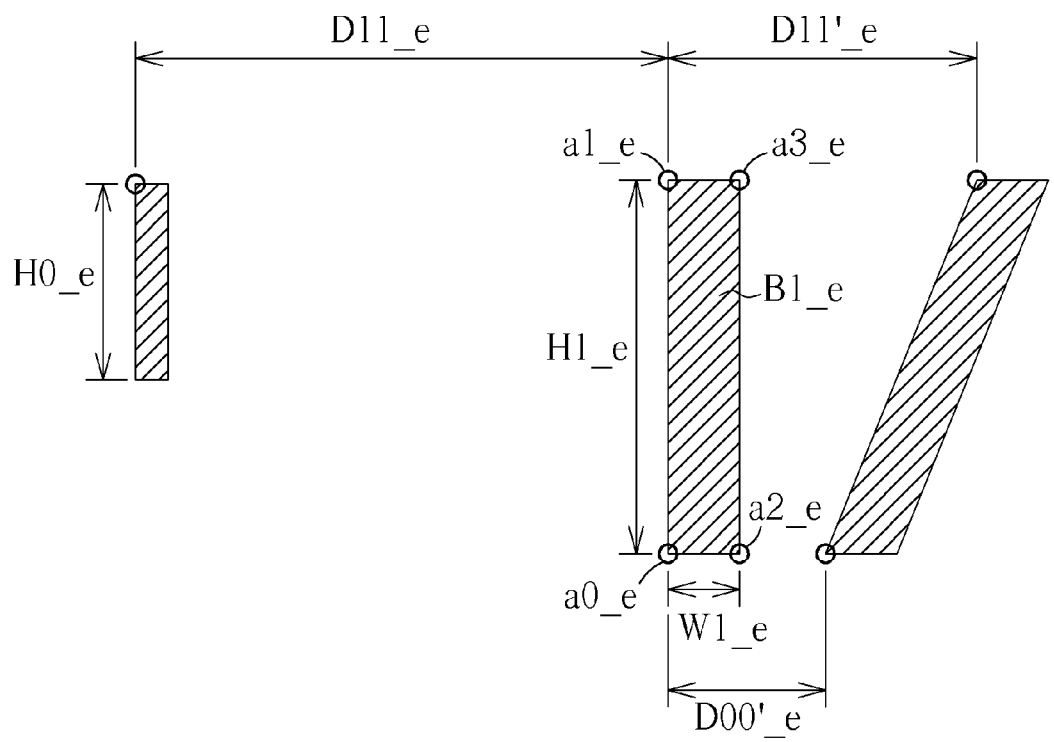
FIG. 8 is a diagram of a pattern having a barcode characteristic that is not a part of a barcode.

Please refer to FIG. 7 again. In this embodiment, the identification bar determining unit 2123 utilizes information of other identification bars near the identification bar B1 to help determine a barcode information containing the identification bar B1. In FIG. 7, an identification bar B1 on the left side of the identification bar B1 has four vertex pixels a0_0, a1_0, a2_0, a3_0, and height parameter H0 and width parameter W0 derived by the identification determining unit 2123, and an identification bar B2 on the right side of the identification bar B1 has four vertex pixels a0_2, a1_2, a2_2, a3_2, and height parameter H2 and width parameter W2 derived by the identification determining unit 2123. Firstly, the identification bar determining unit 2123 determines whether heights of those identification bars B0, B1, B2 are the same, i.e., whether absolute values of difference between the height parameter H1 of the identification bar B1 and the height parameter H0 and H2 of the identification bars B0 and B2, |H1-H0| and |H1-H2| are both more than a height threshold TH_H. In the example of FIG. 8, since a difference of the height parameter H1_e of the identification bar B1_e and the height parameter H0_e of a neighboring identification bar is more than the height threshold, therefore the identification bar determining unit 2123 will determine that the identification bar B1_e is not a part of a barcode. In addition, a distance between each vertex pixel of the identification bar B1 and a corresponding vertex pixel of the neighboring identification bar should also fulfill certain criteria. For example, the vertex pixel a0_1 of the identification bar B1 corresponds to the vertex pixel a0_0 and a0_2 of the identification bar B0 and B2, respectively, so the identification bar determining unit 2123 can derive a vertex distance D00 between vertex pixels a0_1 and a0_0 from coordinates of the vertex pixels and a vertex distance D00' between vertex pixels a0_1 and a0_2 from coordinates of the vertex pixels; likewise, the identification bar determining unit 2123 can derive a vertex distance D11 between vertex pixels a1_1 and a1_0 from coordinates of the vertex pixels and a vertex distance D11' between vertex pixels a1_1 and a1_2 from coordinates of the vertex pixels since, in a barcode, a width of each identification bar and a maximum distance and minimum distance between two neighboring identification bars should follow a certain criteria, therefore the identification bar determining unit 2123 can derive a distance threshold TH_R according to the width parameter W1 of the identification bar B1, and a distance between a vertex pixel and the corresponding vertex pixel should be less than the distance threshold TH_R. However, in the example of FIG. 8, a vertex distance D11_e of the identification bar B1_e exceeds the distance threshold, therefore the identification bar determining unit 2123 determines that the identification bar B1_e is not a part of a barcode. In addition, the identification bar determining unit 2123 will further examine if there is a parallel relationship between the identification bar B1 and neighboring bars: when the identification bars B1 and B0 are parallel, the vertex distances D00 and D11 will be very close in value, therefore a difference between the vertex distances D00 and D11 should be less than a vertex distance threshold TH_D. In FIG. 8, a difference between the vertex distance D11'_e and D00'_e exceeds a vertex distance threshold, indicating that those two identification bars are not in parallel. The identification bar determining unit 2123 will therefore determine that the identification bar B1_e is not a part of a barcode. (function difference in "2123" and "2124" ?)

Figure 9:
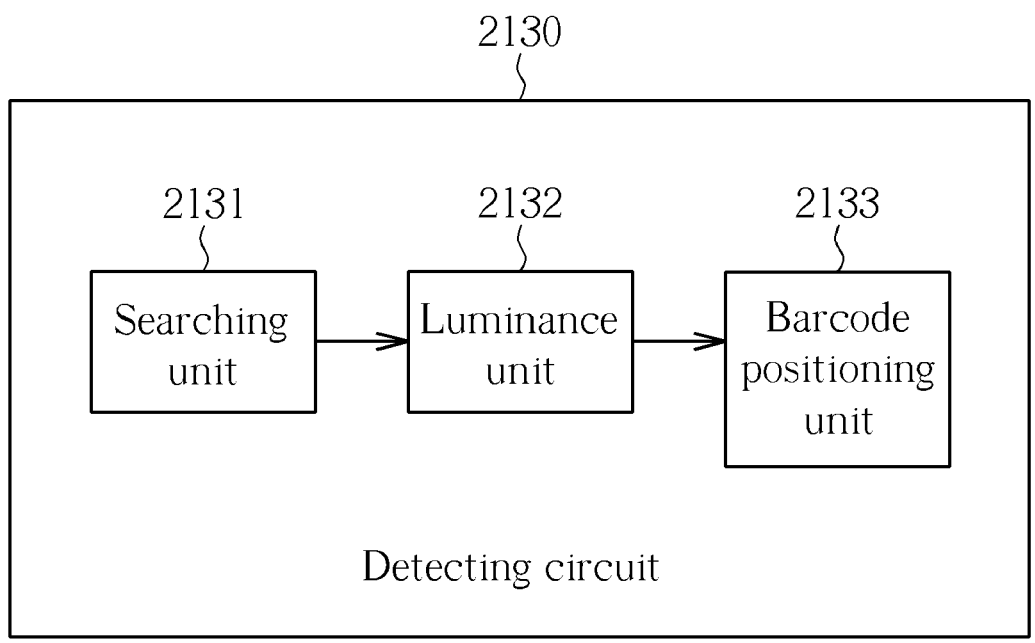
FIG. 9 is an exemplary block diagram of the detecting circuit shown in FIG. 1.
Figure 10:
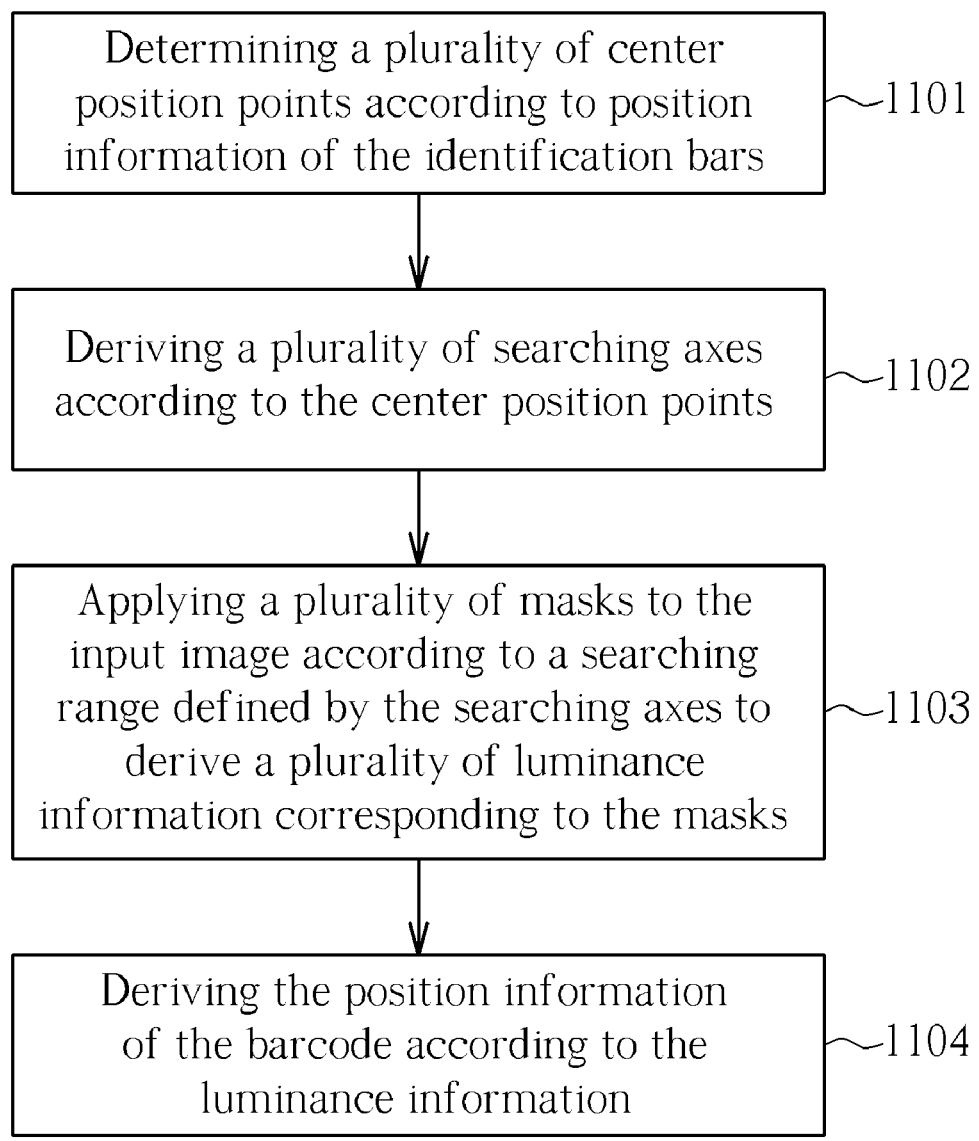
FIG. 10 is an exemplary operation flowchart of the detecting circuit shown in FIG. 1.

After the determining circuit 2120 derives position information of all identification bars of the input image IMG_IN, the detecting circuit 2130 derives the position information of the barcode according to the position information of the identification bars. Please refer to FIG. 9 and FIG. 10 simultaneously. FIG. 9 is an exemplary block diagram of the detecting circuit 2130 shown in FIG. 1, and FIG. 10 is an exemplary operation flowchart of the detecting circuit 2130 shown in FIG. 1. In FIG. 9, the detecting circuit 2130 includes a searching unit 2131, a luminance unit 2132 and a barcode positioning unit 2133. The searching unit 2131 determines a plurality of center position points according to the position information of the identification bars (step 1101), and derives a plurality of searching axes according to the center position points (step 1102). The luminance unit 2132 applies a plurality of masks to the input image IMG_IN according to a searching range defined by the searching axes to derive a plurality of luminance information corresponding to the masks, respectively (step 1103). Finally, the barcode positioning unit 2133 derives the position information of the barcode according to the luminance information (step 1104).

Figure 11:
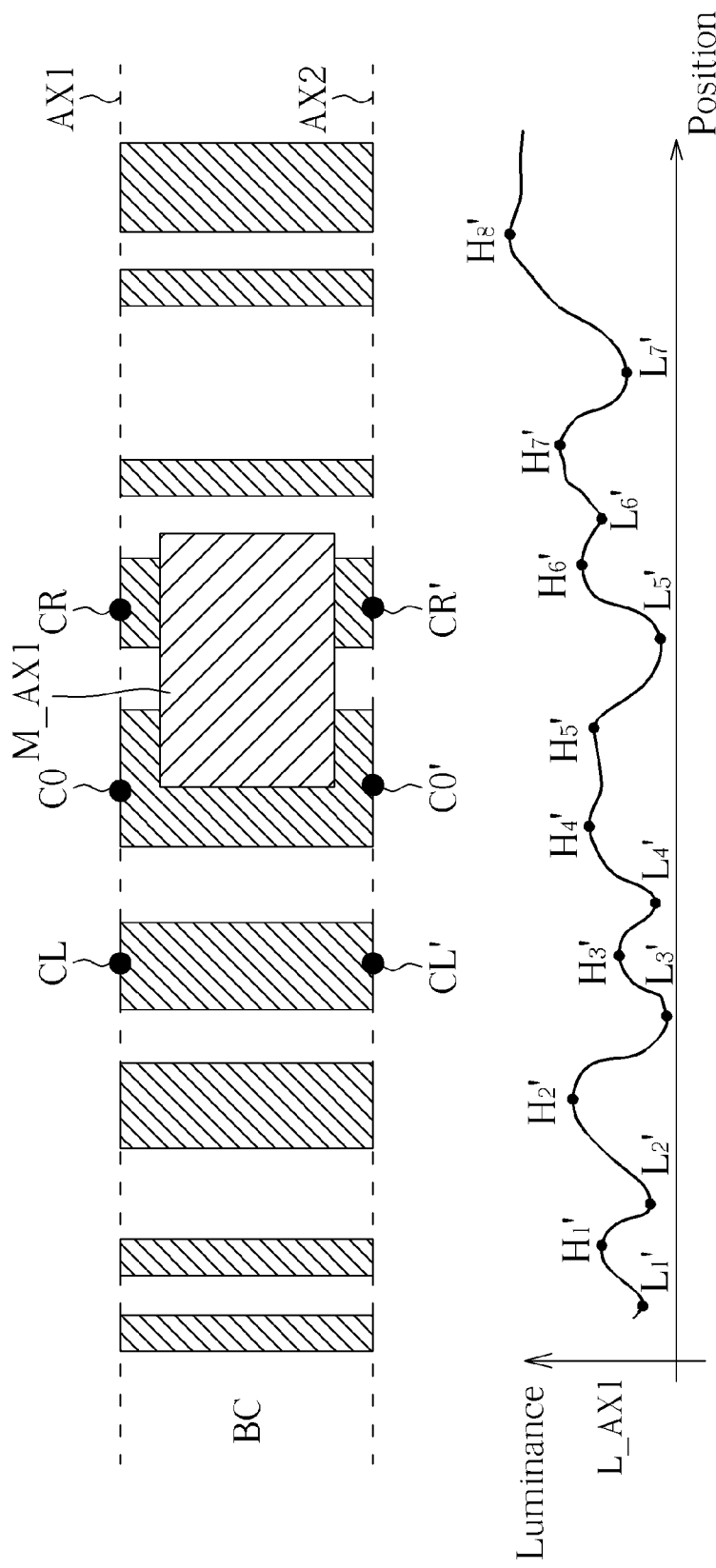
FIG. 11 is an operation diagram of the detecting circuit shown in FIG. 9 determining a searching axis of a barcode and a luminance information corresponding to a mask.
Figure 12:
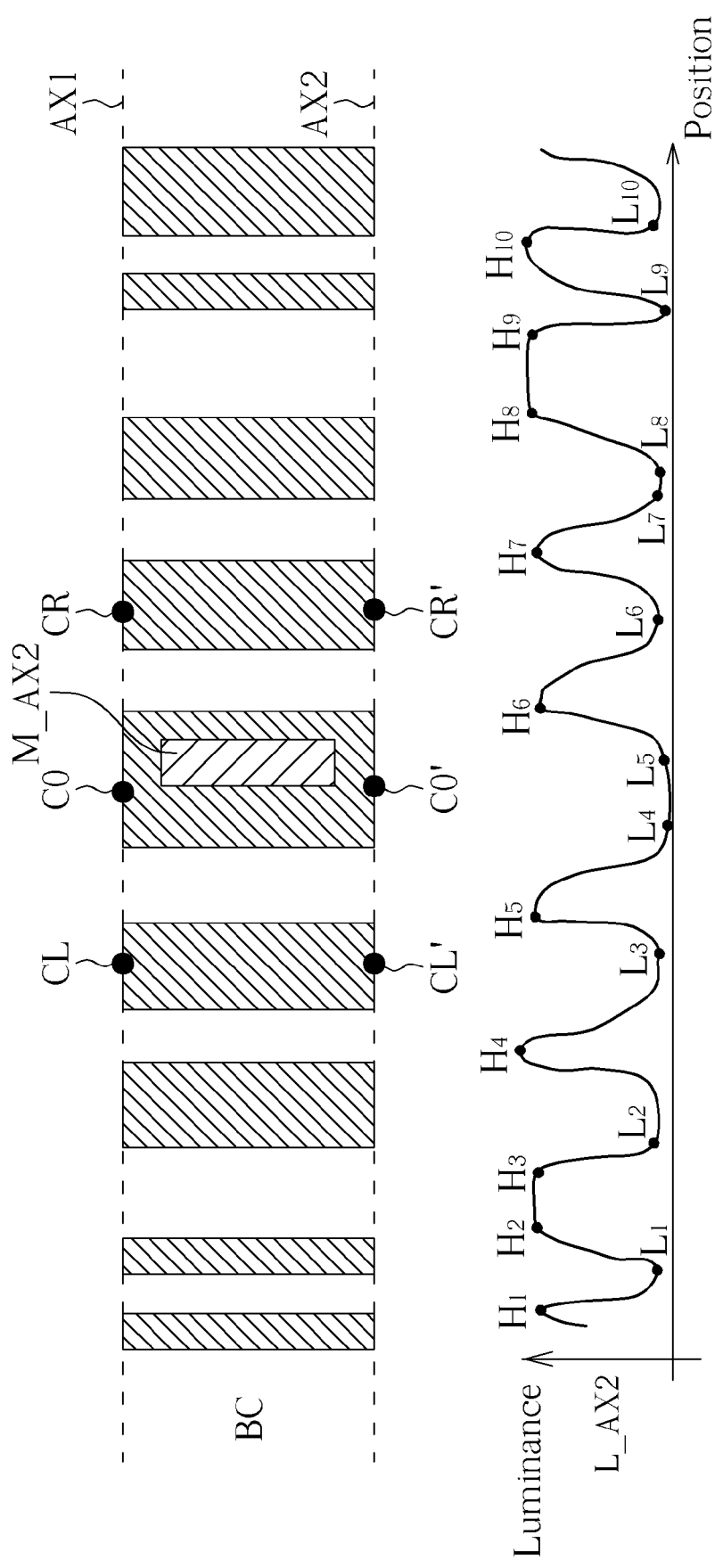
FIG. 12 is another operation diagram of the detecting circuit shown in FIG. 9 determining another luminance information corresponding to another mask.

Please refer to FIG. 11 and FIG. 12 for a further illustration of an exemplary operation of the detecting circuit 2130. FIG. 11 is an operation diagram of the detecting circuit 2130 in FIG. 9 determining a searching axis of a barcode and a luminance information corresponding to a mask, and FIG. 12 is another operation diagram of the detecting circuit 2130 in FIG. 9 determining another luminance information corresponding to another mask. The searching unit 2131 determines a center position point C0 according to the position information of the identification bars: for example, a barcode BC in FIG. 11 has N identification bars, wherein a vertex on the lower left corner of the xth identification bar has a coordinate (a0_x, y0), and x=1~N. A coordinate of the center position point C0 can be determined as (x0, y0), wherein $$x0 = \frac{\sum_{1}^{N} a0\_x}{N}.$$

Next, the searching unit 2131 will determine two coordinates, (xR, y0) and (xL, y0), of the other two center position points CR, CL, respectively, according to the rest of the vertex pixels of the identification bars, wherein $$xR = \frac{\sum_{2}^{N} a0\_x}{N}, \quad xL = \frac{\sum_{1}^{N-1} a0\_x}{N}.$$

According to the aforementioned three center position points C0, CR and CL, the searching unit 2131 can derive a searching axis AX1, and in the same way, the searching unit 2131 can derive three other center position points C0', CR' and CL', and another searching axis AX2, wherein a range defined by these two searching axes is a position where the barcode BC is located. Via the range defined by the searching axes AX1 and AX2, it can be assured that the detecting circuit 2130 can derive all the identification bars of the barcode BC. This is for preventing the determining circuit 2120 from not identifying all the identification bars correctly. After deriving two searching axes, the luminance unit 2132 applies a plurality of masks to the range defined by the searching axes AX1 and AX2 to calculate a plurality of luminance information corresponding to the masks. Since every barcode has a huge quiet zone (which is a white block) at both lateral edges of the barcode, the luminance unit 2132 can derive a position of each lateral edge of the barcode BC according to the luminance information, and thereby derive positions of four vertexes of the barcode BC.

To decrease an influence of the projection distortion, an ordinary image processing apparatus, after receiving an image with a barcode herein, performs a preprocessing procedure to convert a distorted image of the barcode into a standard and easy-to-handle barcode image via a matrix. An ordinary matrix conversion can be denoted as follows:

$$A' = H * A \text{ or} \tag{3}$$

$$\begin{bmatrix} a' \\ b' \\ c' \end{bmatrix} = \begin{bmatrix} h11 & h12 & h13 \\ h21 & h22 & h23 \\ h31 & h32 & h33 \end{bmatrix} \cdot \begin{bmatrix} a \\ b \\ c \end{bmatrix} \tag{4}$$

With further conversion, it can be denoted as the following equation:

$$\begin{bmatrix} -x1 & -y1 & -1 & 0 & 0 & 0 & P1x1 & P1y1 \\ 0 & 0 & 0 & -x1 & -y1 & -1 & Q1x1 & Q1y1 \\ -x2 & -y2 & -1 & 0 & 0 & 0 & P2x2 & P3y2 \\ 0 & 0 & 0 & -x2 & -y2 & -1 & Q2x2 & Q2y2 \\ -x3 & -y3 & -1 & 0 & 0 & 0 & P3x3 & P3y3 \\ 0 & 0 & 0 & -x3 & -y3 & -1 & Q3x3 & Q3y3 \\ -x4 & -y4 & -1 & 0 & 0 & 0 & P4x4 & P4y4 \\ 0 & 0 & 0 & -x4 & -y4 & -1 & Q4x4 & Q4y4 \end{bmatrix} \begin{bmatrix} h11 \\ h12 \\ h13 \\ h21 \\ h22 \\ h23 \\ h31 \\ h32 \end{bmatrix} = \begin{bmatrix} P1 \\ Q1 \\ P2 \\ Q2 \\ P3 \\ Q3 \\ P4 \\ Q5 \end{bmatrix} \quad (5)$$

To solve equation (5), four known sets in two coordinate systems must be required (i.e., four points in one coordinate system and four corresponding points in another coordinate system) to derive a solution of matrix H. In this embodiment, the barcode processing apparatus 2000 utilizes the four vertexes of the barcode for calculation.

Figure 13:
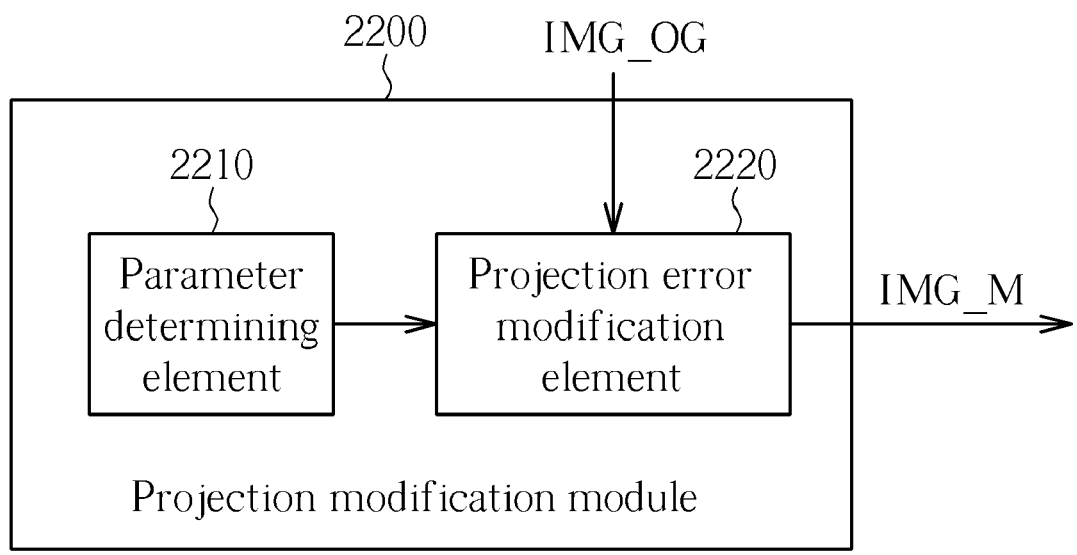
FIG. 13 is an exemplary block diagram of the projection modification module shown in FIG. 1.
Figure 14:
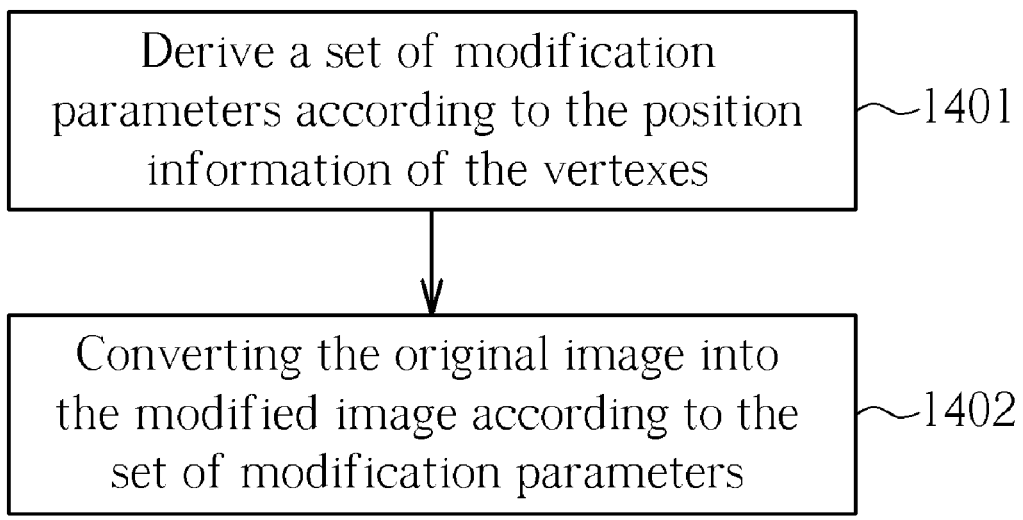
FIG. 14 is an exemplary operation flowchart of the projection modification module shown in FIG. 1.

Please refer to FIG. 13 and FIG. 14 in conjunction with FIG. 1. FIG. 13 is an exemplary block diagram of the projection modification module 2200 in FIG. 1, and FIG. 14 is an exemplary operation flowchart of the projection modification module 2200 in FIG. 1. The projection modification module 2200 includes a parameter determining element 2210 and a projection error modification element 2220. Since the tag searching element will derive the fourth vertex and those position vertexes of the barcode BC within the original image IMG_OG, the parameter determining element 2210 can derive a set of modification parameters, i.e., the matrix H in equation (5), according to the position information of the vertexes (step 1401). The projection error modification element 2220 receives the original image IMG_OG and converts the original image IMG_OG into the modified image IMG_M according to the set of modification parameters (step 1402). The aforementioned matrix conversion should be obvious to those skilled in this field, and therefore further description is omitted here for brevity.

In FIG. 11, the luminance unit 2132 applies a mask M_AX1 to collect luminance information between the searching axes AX1 and AX2, the mask M_AX1 will start from the center position points C0, C0' to move left and right, respectively, and collect luminance values of all pixels within the coverage of the mask M_AX1 to derive a luminance information L_AX1 corresponding to the mask M_AX1; likewise, the luminance unit 2132 applies another mask M_AX2 to collect another luminance information L_AX2 corresponding to the mask M_AX2 between the searching axes AX1 and AX2, as shown in FIG. 12.

For both luminance information L_AX1 and L_AX2, the luminance unit 2132 determines relative peaks and relative valleys among those luminance information according to a specific distance. For example, on the curve of the luminance information L_AX2, no point is higher than a point H1 within the specific distance from the point H1, and the luminance unit 2132 therefore determines that the point H1 is a relative peak. In this way, the luminance unit 2132 determines that the luminance information L_AX2 has relative peaks H1~H10 and relative valleys L1~L10. However, since a barcode has a figure pattern of an alternately interleaving black and white grid, the luminance unit 2132 will further detect positions of the relative peaks and the relative valleys to derive a maximum identification bar number according to the derived information of the relative peaks and the relative valleys. For example, the luminance information L_AX2 has relative peaks H1~H10 and relative valleys L1~L10. When the luminance unit 2132 determines a maximum identification bar number thereof, the luminance unit 2132 detects an arrangement: H1, L1, H2, L2, H4, L3, H5, L4, H6, L6, H7, L7, H8, L9, H10, L10, a relative valley following a relative peak, having a total of eight pairs of relative peaks and valleys, wherein the relative peak H3, H9 and relative valleys L5, L8 do not have corresponding relative valleys or relative peaks at both sides, thereby determines that the luminance information L_AX2 has a maximum identification bar number N_AX2=8. Therefore, when determining the maximum identification bar number, the luminance unit 2132 detects a sequence of seven sets of relative peaks and valleys: L1', H1', L2', H2', L3', H3', L4', L5', H6', L6', H7', L7', H8', and the luminance unit 2132 thereby determines that the luminance information L_AX1 has a maximum identification bar number N_AX1=7. Afterwards, the determining circuit 2120 refers to a maximum value of the maximum identification bar numbers N_AX1 and N_AX2 to determine a luminance information corresponding to a maximum identification bar number (i.e., N_AX2), and recovers all identification bars in the barcode BC via the luminance information L_AX2.

Since the present invention adopts relative luminance to discern timing patterns, even when the input image IMG_IN is influenced by shadows such that both sides of a barcode have a huge luminance difference, the determining circuit 2120 can still derive information of the timing pattern correctly without the influence of shadow. In addition, since barcodes have different coding principles according to different requirements, an appropriate mask for each coding principle also differs. For example, in this embodiment, the mask M_AX2 is over-sized such that it cannot correctly derive a few relative peaks and relative valleys in the barcode BC; however, in other embodiment with a different coding principle (e.g., identification bars are wider and a ratio between the widest identification bar and the thinnest identification bar is 2:1), mask M_AX2 is more suitable than mask M_AX1 to derive positions of each identification bar correctly and quickly.

Figure 15:
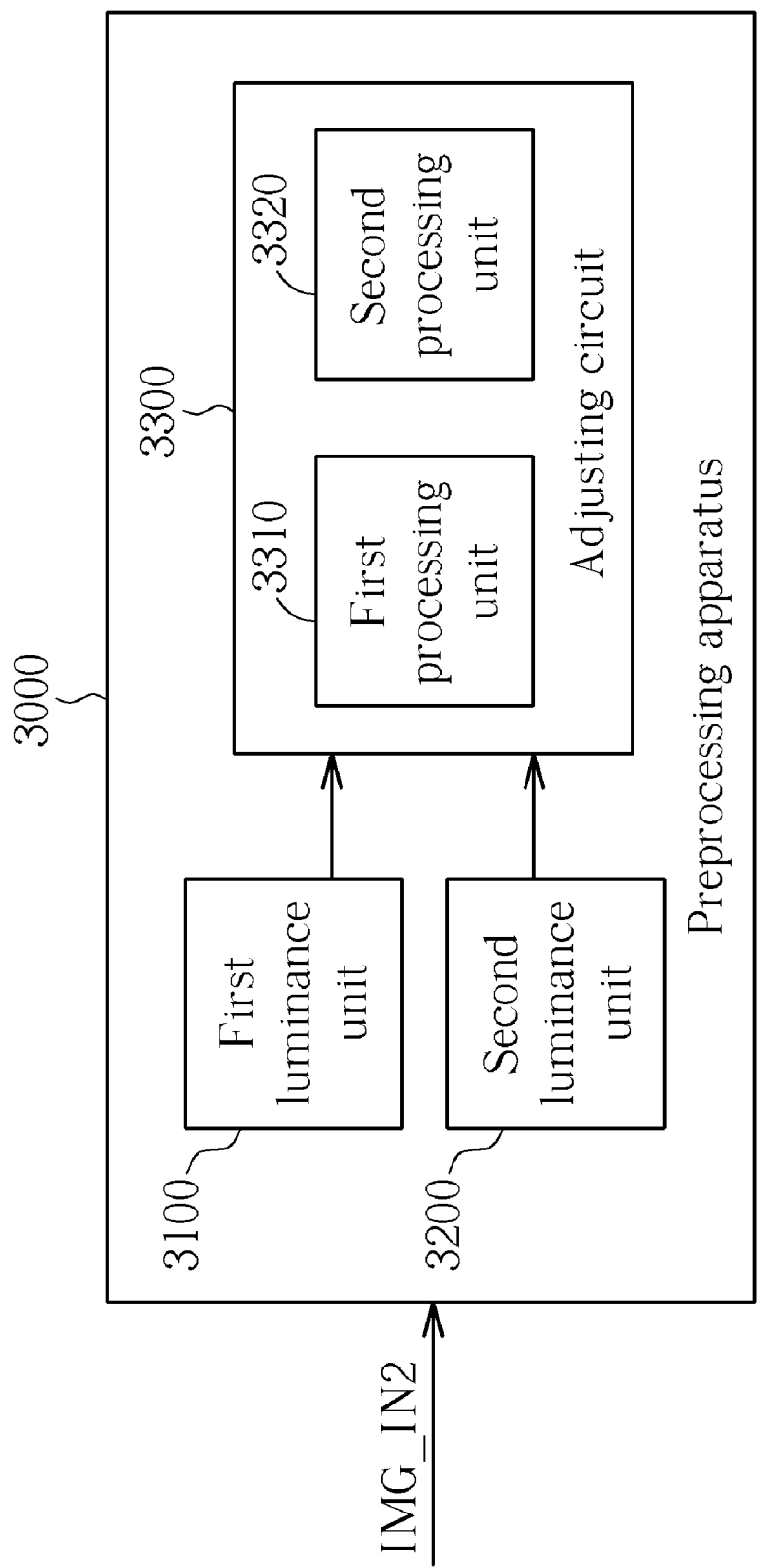
FIG. 15 is a system block diagram of a preprocessing apparatus of barcode according to an embodiment of the present invention.
Figure 16:
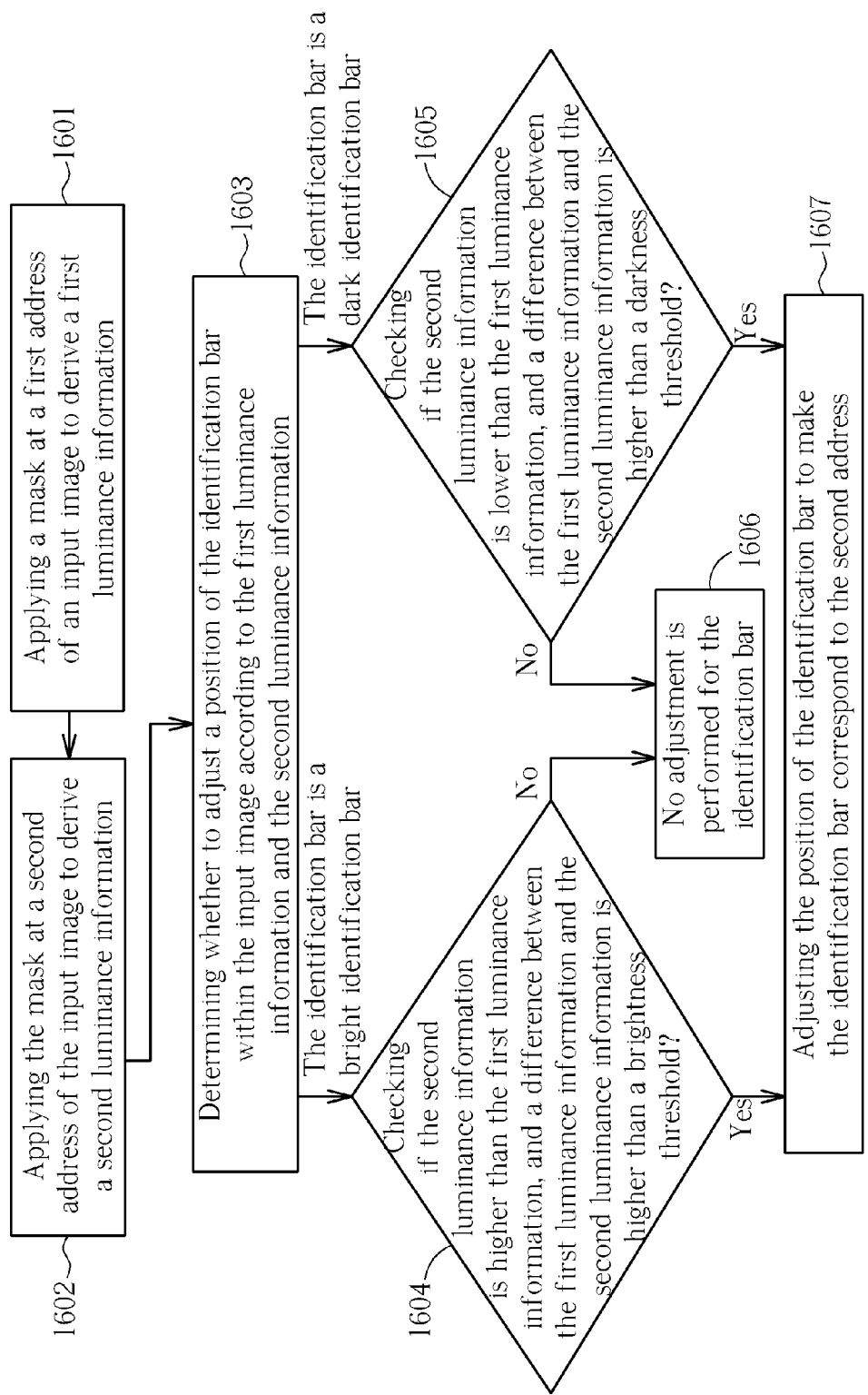
FIG. 16 is an exemplary operation flowchart of a preprocessing apparatus according to an embodiment of the present invention.

According to another embodiment of the present invention, a preprocessing apparatus 3000 of barcode for adjusting an input image IMG_IN2 according to an input image IMG_IN2 and a position information of an identification bar of a barcode within the input image is provided. With the help of the preprocessing apparatus, the barcode can be decoded more easily. Please refer to FIG. 15 and FIG. 16 simultaneously. FIG. 15 is a system block diagram of a preprocessing apparatus 3000 of barcode according to an embodiment of the present invention, and FIG. 16 is an exemplary operation flowchart of the preprocessing apparatus 3000 according to an embodiment of the present invention. In FIG. 16, the preprocessing apparatus 3000 includes a first luminance circuit 3100, a second luminance circuit 3200 and an adjusting circuit 3300, wherein the adjusting circuit includes a first processing unit 3310 and a second processing unit 3320. The first luminance circuit 3100 applies a mask at a first address of an input image IMG_IN2 to derive a first luminance information (step 1601), wherein the first address corresponds to the identification bar within the input image. The second luminance circuit 3200 is for applying the mask at a second address of the input image IMG_IN2 to derive a second luminance information (step 1602), wherein a distance between the first address and the second address is a designated distance. The adjusting circuit 3300 thereby determines whether to adjust a position of the identification bar within the input image IMG_IN2 according to the first luminance information and the second luminance information (step 1603).

When the first luminance information is higher than a predetermined threshold (i.e., the identification bar is a bright identification bar) while the second luminance information is higher than the first luminance information, the first processing unit 3310 examines if a difference between the first luminance information and the second luminance information is higher than a brightness threshold (step 1604). If the difference between the first luminance information and the second luminance information is higher than the brightness threshold, the first processing unit 3310 will adjust the position of the identification bar to make the identification bar correspond to the second address (step 1607); otherwise, no adjustment is performed for the identification bar (step 1606). When the first luminance information is lower than the predetermined threshold (i.e., the identification bar is a dark identification bar) while the second luminance information is lower than the first luminance information, the second processing unit 3320 examines if a difference between the first luminance information and the second luminance information is higher than a darkness threshold (step 1605). If the difference between the first luminance information and the second luminance information is higher than the darknessthreshold, the second processing unit 3320 will adjust the position of the identification bar to make the identification bar correspond to the second address (step 1607); otherwise, no adjustment is performed for the identification bar (step 1606).

Figure 17:
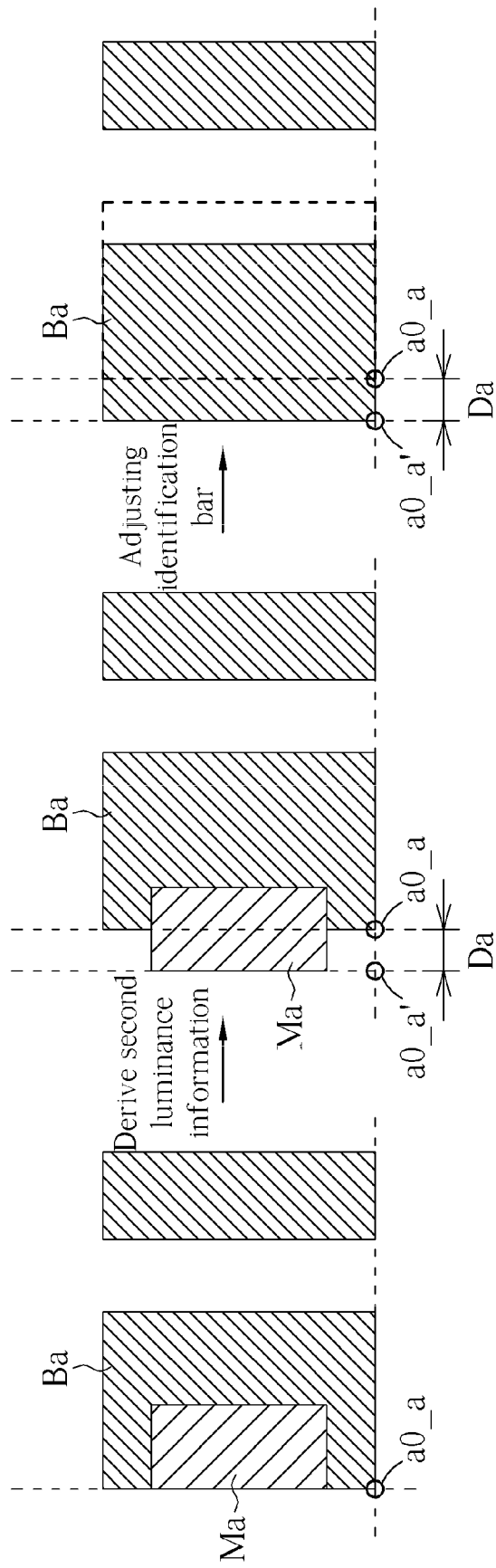
FIG. 17 is an operation diagram of a preprocessing apparatus according to an embodiment of the present invention.

Please refer to FIG. 17 for a further illustration of an operation of the preprocessing apparatus 3000. FIG. 17 is an operation diagram of the preprocessing apparatus 3000 according to an embodiment of the present invention. In this embodiment, an identification bar Ba is one identification bar of a barcode having a reference point a0_a which is located at the lower left corner of the identification bar Ba for locating a position of the identification bar Ba in an input image IMG_IN2. When the preprocessing apparatus 3000 starts to process the identification bar Ba, the first luminance circuit 3100 will set the reference a0_a as the first address to apply a mask Ma to derive all luminance information within a coverage of the mask Ma as a first luminance information, where all the pixels are part of the identification bar Ba. The second luminance circuit 3200 will set a point a0_a', which is located on the left side of reference a0_a by a distance D1, as the second address to apply a mask Ma to derive all luminance information within the coverage of the mask Ma as a second luminance information, where not all pixels are part of the identification bar Ba. In this embodiment, since the identification bar Ba is a dark identification bar, and the first luminance information is lower than a threshold, the second processing unit 3320 will further check if the second luminance information is lower than the first luminance information and a difference between the first luminance information and the second luminance information is higher than the darkness threshold. If all the aforementioned criteria are confirmed to be true, the second processing unit 3320 will move the identification bar to make its reference point as a0_a' instead of a0_a; if one of the aforementioned criteria is confirmed to be false, no adjustment will be made for the identification bar B1. Likewise, when the identification bar Ba is a bright identification bar, the processing procedure of the first processing unit 3310 is substantially the same as when the identification bar Ba is a dark identification bar. Further detail is therefore omitted here for brevity.

Via the aforementioned steps, the preprocessing apparatus 3000 will selectively process all identification bars within the barcode in the input image IMG_IN2 from left to right, or from right to left. In this way, the barcode can be decoded and processed more easily.

Please note that not only can the two aforementioned barcode processing methods and apparatus be utilized independently, but they can also be combined for application. For example, the modified image IMG_M outputted by the barcode processing apparatus 2000 in FIG. 1 can also be an input for the preprocessing apparatus 3000 in FIG. 15.

To summarize, the present invention provides a barcode processing method capable of capturing a barcode within an input image and deriving related information to modify potential errors such as projection distortion and uneven luminance. In addition the present invention can further adjust the barcode such that the barcode can be decoded and processed more easily by a following processing apparatus.

Those skilled in the art will readily observe that numerous modifications and alterations of the device and method may be made while retaining the teachings of the invention.

What is claimed is:

1. A processing method of a barcode, for detecting a barcode from an original image, the processing method comprising:
    an edge processing procedure, for converting the original image into a binarized input image;
    a barcode positioning process, for deriving position information of the barcode, comprising:
        deriving a plurality of luminance groups according to luminance values of all pixels of the input image;
        utilizing a determining circuit to determine whether each luminance group complies with an identification bar of the barcode and to derive position information of identification bars; and
        deriving the position information of the barcode according to the position information of the identification bars; and
    a projection modification process, for converting the original image into a modified image according to the position information of the barcode.

2. The processing method of claim 1, wherein the edge processing procedure comprises:
    performing a filtering procedure for the original image to derive a filtered image;
    performing an addition procedure for the filtered image and the original image to derive an addition image;
    deriving the input image by performing a binarization procedure for the addition image according to a threshold.

3. The processing method of claim 1, wherein the step of determining whether each luminance group complies with an identification bar of the barcode and deriving position information of the identification bars comprises:
    determining a plurality of edge pixels according to luminance values of a plurality of neighboring pixels within a first predetermined range around each pixel within the luminance group;
    determining whether each edge pixel is a corner pixel according to luminance values of a plurality of neighboring pixels within a second range around the edge pixel, wherein:
        for the neighboring pixels, when a ratio of low-luminance pixels to high-luminance pixels is within a predetermined range, the edge pixel is categorized as a corner pixel;
    deriving a plurality of vertex pixels according to relative positions of all corner pixels;
    determining a width parameter and a height parameter corresponding to the luminance group according to the vertex pixels;
    determining whether the luminance group complies with an identification bar of the barcode according to the width parameter, the height parameter, the vertex pixels corresponding to the luminance group and vertex pixels corresponding to a neighboring luminance group; and when the luminance group complies with an identification bar of the barcode, determining the position information of the identification bar according to the vertex pixels, the width parameter and the height parameter.

4. The processing method of claim 1, wherein the step of deriving the position information of the barcode according to the position information of the identification bars comprises:
   determining a plurality of center position points according to the position information of the identification bars;
   deriving a plurality of searching axes according to the center position points;
   applying a plurality of masks to the input image according to a searching range defined by the searching axes to derive luminance information corresponding to the masks, respectively; and
   deriving the position information of the barcode according to the luminance information corresponding to the masks.

5. A processing method of a barcode, for adjusting an input image according to an input image and position information of an identification bar of a barcode within the input image, the processing method comprising:
   applying a mask at a first address of the input image according to the position information of the identification bar to derive a first luminance information, wherein the first address corresponds to the identification bar within the input image;
   applying the mask at a second address of the input image to derive a second luminance information, wherein a distance between the first address and the second address is a designated distance; and
   determining whether to adjust a position of the identification bar within the input image according to the first luminance information and the second luminance information.

6. The processing method of claim 5, wherein the step of determining whether to adjust a position of the identification bar within the input image according to the first luminance information and the second luminance information comprises:
   when the first luminance information is higher than a predetermined threshold, the second luminance information is higher than the first luminance information and a difference between the first luminance information and the second luminance information is higher than a brightness threshold, adjusting the position of the identification bar to make the identification bar correspond to the second address; and
   when the first luminance information is lower than the predetermined threshold, the second luminance information is lower than the first luminance information and a difference between the first luminance information and the second luminance information is lower than a darkness threshold, adjusting the position of the identification bar to make the identification bar correspond to the second address.

7. A processing apparatus of a barcode, for detecting a barcode from an original image, the processing apparatus comprising:
   an edge processing module, for converting the original image into a Binarized input image;
   a barcode positioning module, coupled to the edge processing module, for deriving position information of the barcode, comprising:
      a capture circuit, for deriving a plurality of luminance groups according to luminance values of all pixels of the input image;
      a determining circuit, coupled to the capture circuit, for determining whether each luminance group complies with an identification bar of the barcode and deriving position information of identification bars; and
      a detection circuit, coupled to the determining circuit, for deriving the position information of the barcode according to the position information of the identification bars; and
   a projection modification module, coupled to the barcode positioning module, for converting the original image into a modified image according to the position information of the barcode.

8. The processing apparatus of claim 7, wherein the edge processing module comprises:
   a filtering element, for performing a filtering procedure for the original image to derive a filtered image;
   an addition element, coupled to the filtering element, for performing an addition procedure for the filtered image and the original image to derive an addition image; and
   an image capture element, coupled to the addition element, for deriving the input image by performing a binarization procedure for the addition image according to a threshold.

9. The processing apparatus of claim 7, wherein the determining circuit comprises:
   a corner capture unit, for determining a plurality of edge pixels according to luminance values of a plurality of neighboring pixels within a first predetermined range around each pixel within the luminance group, and determining whether each edge pixel is a corner pixel according to luminance values of a plurality of neighboring pixels within a second range around the edge pixel, wherein for the neighboring pixels, when a ratio of low-luminance pixels to high-luminance pixels is within a predetermined range, the corner capture unit categorizes the edge pixel as a corner pixel;
   a vertex capture unit, coupled to the corner capture unit, for deriving a plurality of vertex pixels according to relative positions of all corner pixels, and determining a width parameter and a height parameter corresponding to the luminance group according to the vertex pixels;
   an identification bar determining unit, coupled to the vertex capture unit, for determining whether the luminance group complies with an identification bar of the barcode according to the width parameter, the height parameter, the vertex pixels corresponding to the luminance group and vertex pixels corresponding to a neighboring luminance group; and
   an identification bar positioning unit, coupled to the identification bar determining unit, for determining the position information of the barcode according to the vertex pixels, the width parameter and the height parameter.

10. The processing apparatus of claim 7, wherein the detection circuit comprises:
   a searching unit, for determining a plurality of center position points according to the position information of the identification bars, and deriving a plurality of searching axes according to the center position points;
   a luminance unit, coupled to the searching unit, for applying a plurality of masks to the input image according to a searching range defined by the searching axes to derive luminance information corresponding to the masks, respectively; and a barcode positioning unit, coupled to the luminance unit, for deriving the position information of the barcode according to the luminance information corresponding to the masks.

11. A preprocessing apparatus of barcode, for adjusting an input image according to an input image and position information of an identification bar of a barcode within the input image, the processing apparatus comprising:
   a first luminance circuit, for applying a mask at a first address of the input image according to the position information of the identification bar to derive a first luminance information, wherein the first address corresponds to the identification bar within the input image;
   a second luminance circuit, for applying the mask at a second address of the input image to derive a second luminance information, wherein a distance between the first address and the second address is a designated distance; and
   an adjusting circuit, coupled to the first luminance circuit and the second luminance circuit, for determining whether to adjust a position of the identification bar within the input image according to the first luminance information and the second luminance information.

12. The processing apparatus of claim 11, wherein the adjusting circuit comprises:
   a first processing unit, wherein when the first luminance information is higher than a predetermined threshold while the second luminance information is higher than the first luminance information and a difference between the first luminance information and the second luminance information is higher than a brightness threshold, the first processing unit adjusts the position of the identification bar to make the identification bar correspond to the second address; and
   a second processing unit, wherein when the first luminance information is lower than the predetermined threshold while the second luminance information is lower than the first luminance information and a difference between the first luminance information and the second luminance information is lower than a darkness threshold, the second processing unit adjusts the position of the identification bar to make the identification bar correspond to the second address.

13. A processing method of a barcode, for detecting a barcode from an original image, the processing method comprising:
   an edge processing procedure, for converting the original image into a binarized input image, comprising:
      performing a filtering procedure for the original image to derive a filtered image;
      performing an addition procedure for the filtered image and the original image to derive an addition image; and
      deriving the input image by performing a binarization procedure for the addition image according to a threshold;
   a barcode positioning process, for deriving position information of the barcode, comprising:
      deriving a plurality of luminance groups according to luminance values of all pixels of the input image;
      utilizing a determining circuit to determine whether each luminance group complies with an identification bar of the barcode and to derive position information of identification bars; and
      deriving the position information of the barcode according to the position information of the identification bars; and
   a projection modification process, for converting the original image into a modified image according to the position information of the barcode.

14. A processing method of a barcode, for detecting a barcode from an original image, the processing method comprising:
   an edge processing procedure, for converting the original image into a binarized input image;
   a barcode positioning process, for deriving position information of the barcode, comprising:
      deriving a plurality of luminance groups according to luminance values of all pixels of the input image;
      utilizing a determining circuit to determine whether each luminance group complies with an identification bar of the barcode and to derive position information of identification bars, comprising:
         determining a plurality of edge pixels according to luminance values of a plurality of neighboring pixels within a first predetermined range around each pixel within the luminance group;
         determining whether each edge pixel is a corner pixel according to luminance values of a plurality of neighboring pixels within a second range around the edge pixel, wherein:
            for the neighboring pixels, when a ratio of low-luminance pixels to high-luminance pixels is within a predetermined range, the edge pixel is categorized as a corner pixel;
         deriving a plurality of vertex pixels according to relative positions of all corner pixels;
         determining a width parameter and a height parameter corresponding to the luminance group according to the vertex pixels;
      determining whether the luminance group complies with an identification bar of the barcode according to the width parameter, the height parameter, the vertex pixels corresponding to the luminance group and vertex pixels corresponding to a neighboring luminance group; and
      when the luminance group complies with an identification bar of the barcode, determining the position information of the identification bar according to the vertex pixels, the width parameter and the height parameter; and
   deriving the position information of the barcode according to the position information of the identification bars; and
   a projection modification process, for converting the original image into a modified image according to the position information of the barcode.

15. A processing method of a barcode, for detecting a barcode from an original image, the processing method comprising:
   an edge processing procedure, for converting the original image into a binarized input image;
   a barcode positioning process, for deriving position information of the barcode, comprising:
      deriving a plurality of luminance groups according to luminance values of all pixels of the input image;
      utilizing a determining circuit to determine whether each luminance group complies with an identification bar of the barcode and to derive position information of identification bars; and
      deriving the position information of the barcode according to the position information of the identification bars, comprising:
         determining a plurality of center position points according to the position information of the identification bars;

deriving a plurality of searching axes according to the center position points;

applying a plurality of masks to the input image according to a searching range defined by the searching axes to derive luminance information corresponding to the masks, respectively; and deriving the position information of the barcode according to the luminance information corresponding to the masks; and a projection modification process, for converting the original image into a modified image according to the position information of the barcode.

16. A processing apparatus of a barcode, for detecting a barcode from an original image, the processing apparatus comprising:

an edge processing module, for converting the original image into a binarized input image, comprising:

a filtering element, for performing a filtering procedure for the original image to derive a filtered image;

an addition element, coupled to the filtering element, for performing an addition procedure for the filtered image and the original image to derive an addition image; and an image capture element, coupled to the addition element, for deriving the input image by performing a binarization procedure for the addition image according to a threshold;

a barcode positioning module, coupled to the edge processing module, for deriving position information of the barcode, comprising:

a capture circuit, for deriving a plurality of luminance groups according to luminance values of all pixels of the input image;

a determining circuit, coupled to the capture circuit, for determining whether each luminance group complies with an identification bar of the barcode and deriving position information of identification bars; and a detection circuit, coupled to the determining circuit, for deriving the position information of the barcode according to the position information of the identification bars; and a projection modification module, coupled to the barcode positioning module, for converting the original image into a modified image according to the position information of the barcode.

17. A processing apparatus of a barcode, for detecting a barcode from an original image, the processing apparatus comprising:

an edge processing module, for converting the original image into a binarized input image;

a barcode positioning module, coupled to the edge processing module, for deriving position information of the barcode, comprising:

a capture circuit, for deriving a plurality of luminance groups according to luminance values of all pixels of the input image;

a determining circuit, coupled to the capture circuit, for determining whether each luminance group complies with an identification bar of the barcode and deriving position information of identification bars, comprising:

a corner capture unit, for determining a plurality of edge pixels according to luminance values of a plurality of neighboring pixels within a first predetermined range around each pixel within the luminance group, and determining whether each edge pixel is a corner pixel according to luminance values of a plurality of neighboring pixels within a second range around the edge pixel, wherein for the neighboring pixels, when a ratio of low-luminance pixels to high-luminance pixels is within a predetermined range, the corner capture unit categorizes the edge pixel as a corner pixel;

a vertex capture unit, coupled to the corner capture unit, for deriving a plurality of vertex pixels according to relative positions of all corner pixels, and determining a width parameter and a height parameter corresponding to the luminance group according to the vertex pixels;

an identification bar determining unit, coupled to the vertex capture unit, for determining whether the luminance group complies with an identification bar of the barcode according to the width parameter, the height parameter, the vertex pixels corresponding to the luminance group and vertex pixels corresponding to a neighboring luminance group; and an identification bar positioning unit, coupled to the identification bar determining unit, for determining the position information of the barcode according to the vertex pixels, the width parameter and the height parameter; and a detection circuit, coupled to the determining circuit, for deriving the position information of the barcode according to the position information of the identification bars; and a projection modification module, coupled to the barcode positioning module, for converting the original image into a modified image according to the position information of the barcode.

18. A processing apparatus of a barcode, for detecting a barcode from an original image, the processing apparatus comprising:

an edge processing module, for converting the original image into a binarized input image;

a barcode positioning module, coupled to the edge processing module, for deriving position information of the barcode, comprising:

a capture circuit, for deriving a plurality of luminance groups according to luminance values of all pixels of the input image;

a determining circuit, coupled to the capture circuit, for determining whether each luminance group complies with an identification bar of the barcode and deriving position information of identification bars; and a detection circuit, coupled to the determining circuit, for deriving the position information of the barcode according to the position information of the identification bars, comprising:

a searching unit, for determining a plurality of center position points according to the position information of the identification bars, and deriving a plurality of searching axes according to the center position points;

a luminance unit, coupled to the searching unit, for applying a plurality of masks to the input image according to a searching range defined by the searching axes to derive luminance information corresponding to the masks, respectively; and a barcode positioning unit, coupled to the luminance unit, for deriving the position information of the barcode according to the luminance information corresponding to the masks; and a projection modification module, coupled to the barcode positioning module, for converting the original image into a modified image according to the position information of the barcode.

* * * * *